US009600279B2

United States Patent
Jarboe

(10) Patent No.: US 9,600,279 B2
(45) Date of Patent: Mar. 21, 2017

(54) CIRCUIT AND METHOD FOR SEARCHING A DATA ARRAY AND SINGLE-INSTRUCTION, MULTIPLE-DATA PROCESSING UNIT INCORPORATING THE SAME

(75) Inventor: Stephen E. Jarboe, Carrollton, TX (US)

(73) Assignee: VERISILICON HOLDINGS CO., LTD., Plano, TX (US)

(*) Notice: Subject to any disclaimer, the term of this patent is extended or adjusted under 35 U.S.C. 154(b) by 689 days.

(21) Appl. No.: 13/559,380

(22) Filed: Jul. 26, 2012

(65) Prior Publication Data

US 2014/0032879 A1    Jan. 30, 2014

(51) Int. Cl.
*G06F 7/06* (2006.01)
*G06F 9/30* (2006.01)

(52) U.S. Cl.
CPC ...... *G06F 9/30036* (2013.01); *G06F 9/30021* (2013.01)

(58) Field of Classification Search
None
See application file for complete search history.

(56) References Cited

U.S. PATENT DOCUMENTS

| | | | | |
|---|---|---|---|---|
| 7,694,068 | B1* | 4/2010 | Rosman | 711/108 |
| 2006/0101230 | A1* | 5/2006 | Roth et al. | 712/9 |
| 2012/0023308 | A1* | 1/2012 | Kumura | G06F 7/544 712/7 |
| 2013/0080490 | A1* | 3/2013 | Plondke | G06F 17/18 708/207 |

* cited by examiner

*Primary Examiner* — Cheng-Yuan Tseng

(57) ABSTRACT

Search circuitry responsive to a single instruction for undertaking a step of a search of a data array for an extreme value therein, a method of searching a data array to identify an extreme value therein and a location thereof and a single-instruction, multiple-data (SIMD) processing unit incorporating the search circuitry or the method. In one embodiment, the search circuitry includes: a comparison element configured to compare two values in the data array, (2) multiplexers coupled to the comparison element and configured to select a more extreme value of the two values and a location in the data array of the more extreme value and (3) an incrementer configured to increment a counter associated with the search.

17 Claims, 4 Drawing Sheets

CIRCUIT AND METHOD FOR SEARCHING A DATA ARRAY AND SINGLE-INSTRUCTION, MULTIPLE-DATA PROCESSING UNIT INCORPORATING THE SAME

TECHNICAL FIELD

This application is directed, in general, to a computer processors and, more specifically, to a system and method, incorporatable in a computer processor, for searching a data array.

BACKGROUND

Modern computer systems are frequently faced with the task of identifying (i.e., noting the value and location of) an extreme (i.e., minimum or maximum) value in a data array. The challenge, however, is how to do so quickly and efficiently. Given an array x[N] having N elements, and assuming max_value is to contain the maximum value and max_index is to contain its location in the array, Table 1, below, expresses in C code the general software algorithm for searching an array for the maximum value contained in it:

TABLE 1

A General Software Algorithm for Searching an Array for a Maximum Value

```
max_value = x[0];
max_index = 0;
for(i=1;i<N;i++) {
    if(x[i]>max_value) {
        max_value = x[i];
        max_index = i;
    }
}
```

Likewise, assuming min_value is to contain the minimum value and min_index is to contain its location in the array, Table 2, below, expresses in C code the general software algorithm for searching an array for the minimum value contained in it:

TABLE 2

A General Software Algorithm for Searching an Array for a Minimum Value

```
min_value = x[0];
min_index = 0;
for(i=1;i<N;i++) {
    if(x[i]<min_value) {
        min_value = x[i];
        min_index = i;
    }
}
```

Unfortunately, the best conventional software algorithms for performing this task require multiple computer instructions to perform each step of the search. Further, these algorithms work better with some value and index sizes than others. For example, in the ZSP400® (a conventional single-instruction, multiple-data, or SIMD, processing unit commercially available from VeriSilicon, Inc., of Santa Clara, Calif.), a search for a maximum 16-bit value can be carried out with a 16-bit index by maintaining the index in the low 16-bits of a 32-bit register and executing the first algorithm set forth above. However, this approach does not scale up to 32-bit indexes. And, as noted above, each step of the search requires multiple computer instructions.

SUMMARY

One aspect provides search circuitry responsive to a single instruction for undertaking a step of a search of a data array for an extreme value therein. In one embodiment, the search circuitry includes: a comparison element configured to compare two values in the data array, (2) multiplexers coupled to the comparison element and configured to select a more extreme value of the two values and a location in the data array of the more extreme value and (3) an incrementer configured to increment a counter associated with the search.

Another aspect provides a method of searching a data array to identify an extreme value therein and a location thereof. In one embodiment, the method includes: (1) issuing a single instruction that instructs search circuitry to undertake a step of a search of a data array for an extreme value therein, the search circuitry performing in the step: (2) comparing values of two elements in the data array, (3) selecting a more extreme value of the two values and a location in the data array of the more extreme value and (4) incrementing a counter associated with the search.

Yet another aspect provides a SIMD processing unit. In one embodiment, the processing unit includes: (1) a pipeline control unit, (2) register files coupled to the pipeline control unit, (3) a load/store unit coupled to the register files and (4) search circuitry coupled to the register files and responsive to a single instruction for undertaking a step of a search of a data array for an extreme value therein, including: (4a) comparison elements configured to compare two values in the data array, (4b) multiplexers coupled to the comparison elements and configured to select a more extreme value of the two values and a location in the data array of the more extreme value and (4c) incrementers configured to increment counters associated with the search.

BRIEF DESCRIPTION

Reference is now made to the following descriptions taken in conjunction with the accompanying drawings, in which.

DETAILED DESCRIPTION

As stated above, the best conventional software algorithms require multiple computer instructions to perform each step of the search of an array. It is recognized herein that the task of identifying an extreme value in a data array can be made more quick and efficient were a processing unit to be augmented with search circuitry for searching an array and further were the instruction set of such a processing unit to be augmented with at least one instruction that invokes the operation of the search circuitry. It is more specifically recognized herein that a processing unit would benefit from search circuitry dedicated to comparing array element values, copying evermore extreme values and their locations and incrementing the index to continue the search and would further benefit from at least one instruction that would allow these operations to be performed in a single clock cycle. It is also recognized that the search circuitry and such at least one instruction may benefit from being scalable to indices of different length. It is further recognized that processing units of various types and architectures, in addition to SIMD processing units, would benefit from the search circuitry and such at least one instruction.

Accordingly, disclosed herein are various embodiments of search circuitry for performing a step in an array search and a computer instruction that invokes the search circuitry. In the illustrated embodiments, the search circuitry is capable of performing the step of the search in a single clock cycle. Also in the illustrated embodiments, counterparts of the search circuitry are provided in each lane of a SIMD processing unit. Alternative embodiments of the search circuitry may be employed alone in single-instruction, single-data (SISD) processing units, in the multiple pipelines of a parallel (superscalar) processing unit or in specialized processor architectures, such as digital signal processors (DSPs).

The illustrated embodiments of the search circuitry are capable of performing the following operations associated with a single step of an array search: (1) comparing element values, (2) copying evermore extreme values and their locations and (3) incrementing the index. Those skilled in the art will understand, however, that the search circuitry may be modified to perform other operations as part of an array search step.

Figure 1:
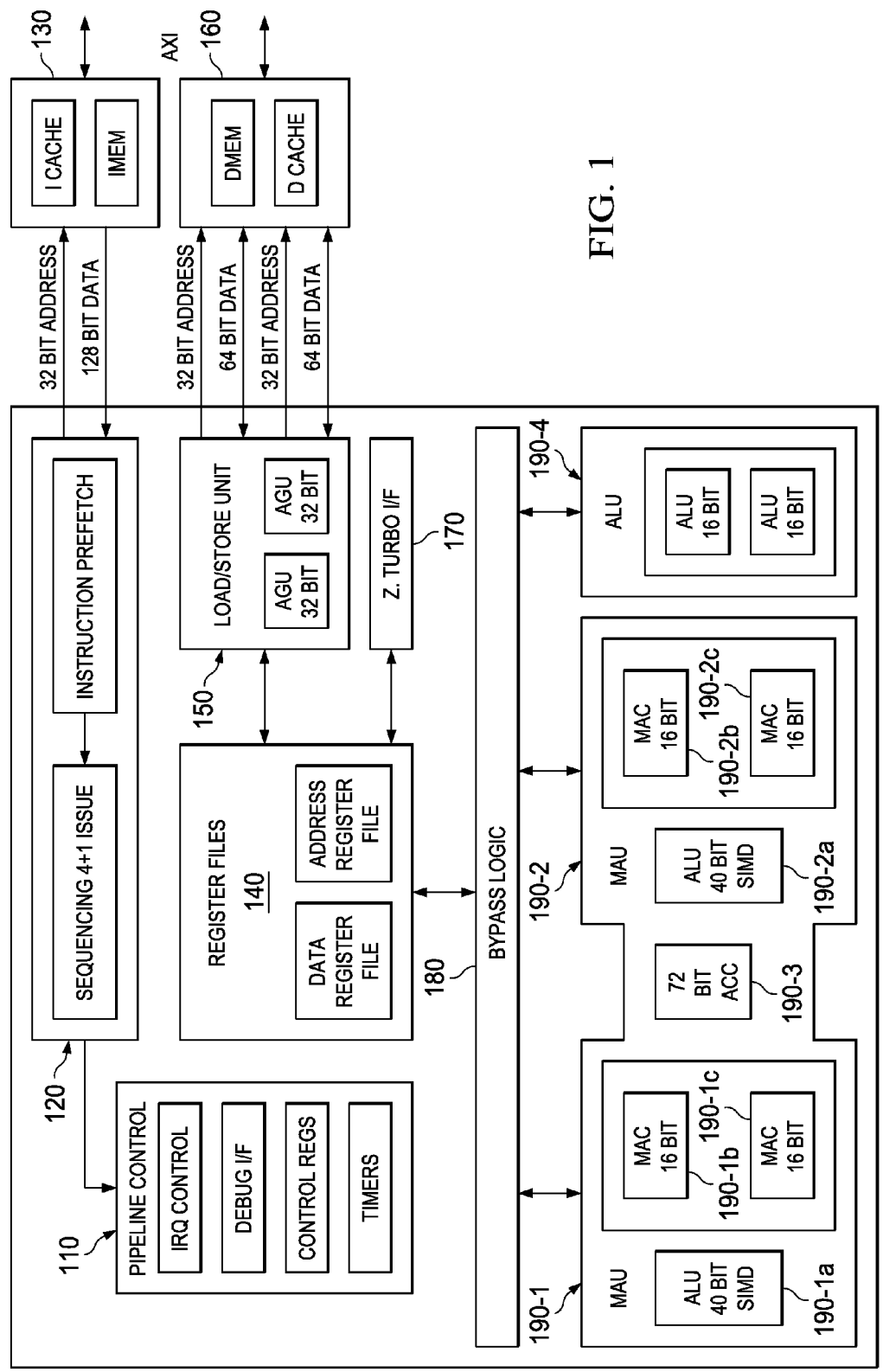
FIG. 1 is a block diagram of one embodiment of a SIMD processing unit including search circuitry for searching a data array to identify an extreme value therein and a location thereof.

As stated above, the illustrated embodiments of the search circuitry happen to operate in the environment of a SIMD processing unit. Accordingly, before describing the various illustrated embodiments, an example SIMD processing unit will be illustrated and described. FIG. 1 is a block diagram of one embodiment of a SIMD processing unit including search circuitry for searching a data array to identify an extreme value therein and a location thereof. The SIMD processing unit includes a pipeline control unit 110 that receives prefetched and sequenced instructions from a prefetch unit 120, which, in turn, communicates with an instruction cache and memory 130. Register files 140, used to store both data and addresses, are coupled to a load/store unit 150, which, in turn, is coupled to a data cache and memory 160 and a turbo interface 170. The turbo interface 170 allows user-defined logic to be connected to the SIMD processing unit.

The register files 140 are likewise coupled to bypass logic 180. The bypass logic is coupled to circuitry configured to perform mathematical and logical operations on constants or data stored in the register file 140 or the data cache and memory 160. The circuitry includes first and second MAUs 190-1, 190-1. The first MAU 190-1 includes an arithmetic and logic unit 190-1a and first and second multipliers/accumulators 190-1b, 190-1c. The second MAU 190-2 includes an arithmetic and logic unit 190-2a and first and second multipliers/accumulators 190-2b, 190-2c. Another accumulator 190-3 is configured to accumulate results from the first and second MAUs 190-1, 190-2. An ALU 190-4 is likewise coupled to the bypass logic 180.

Having described an embodiment of a SIMD that can serve as an environment within which embodiments of the novel search circuitry disclosed herein may operate, and with the understanding that processing units of other types are suitable environments for the search circuitry, various embodiments of the search circuitry will now be described. In general, the described embodiments carry out three functions, in response to one instruction, that are part of one step of a data array search: (1) comparing array element values, (2) copying values and their locations that are evermore extreme and (3) incrementing an index (or an address) to continue the search. Two general embodiments will be described, one having a 16-bit datapath, and another having a 32-bit datapath, which may be made from two 16-bit datapaths.

Figure 2:
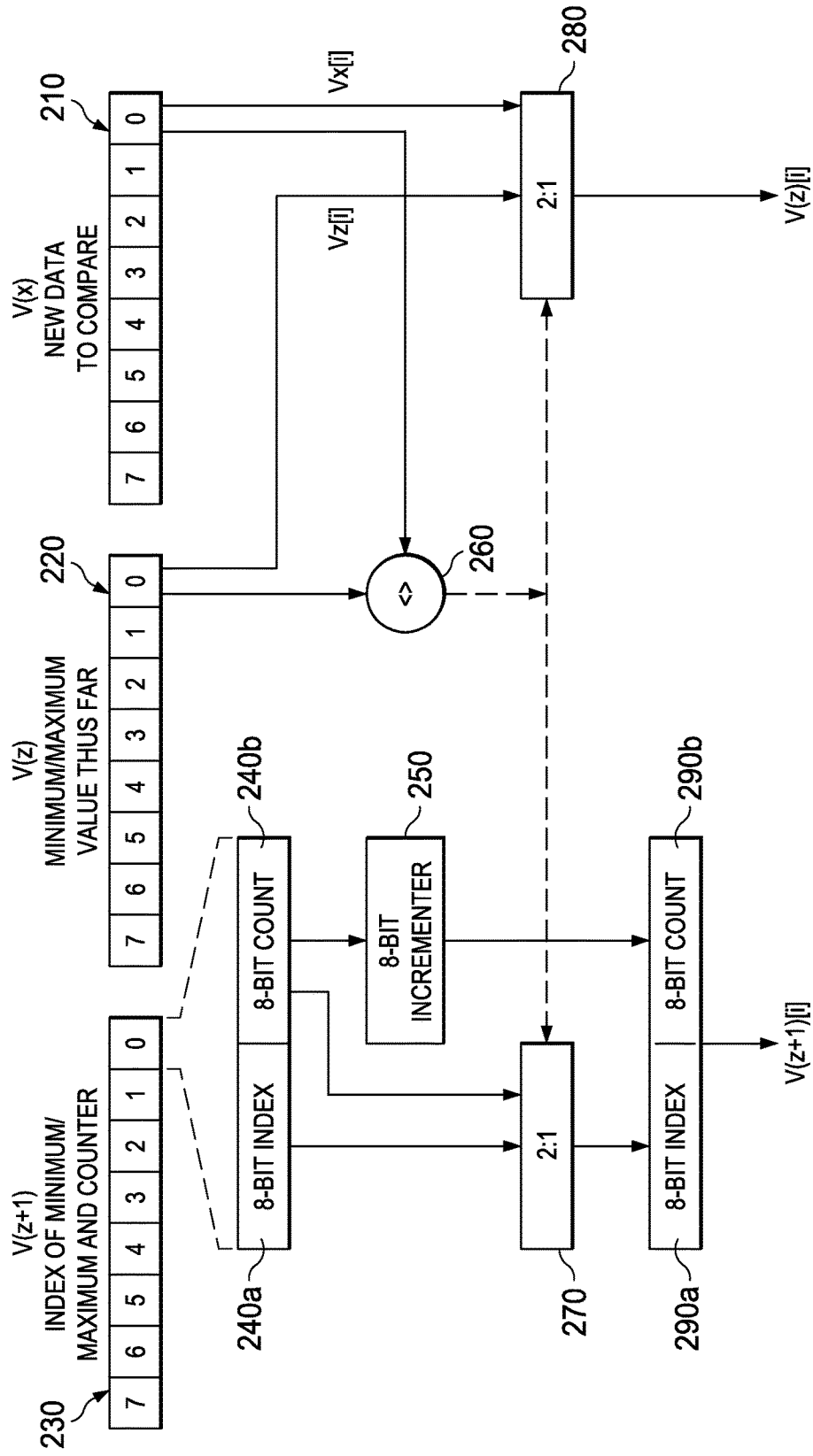
FIG. 2 is a schematic diagram of one embodiment of search circuitry for searching a data array to identify an extreme value therein and a location thereof operable in a processor having a 16-bit datapath.

FIG. 2 is a schematic diagram of one embodiment of search circuitry for searching a data array to identify an extreme value therein and a location thereof operable in a processor having a 16-bit datapath. Slot 0 of a register 210 (e.g., register V(x) of the register files 140 of FIG. 1) contains the value of an element of a data array to be compared. Slot 0 of a register 220 (e.g., register V(z) of the register files 140 of FIG. 1) contains the value of an element that is currently regarded as extreme. Slot 0 of a register 230 (e.g., register V(z+1) of the register files 140 of FIG. 1) contains the value of an 8-bit index 240a indicating the location of the element contained in slot 0 of V(z) and the value of an 8-bit counter 240b indicating the progress of the search being performed through the data array. In an alternative embodiment, slot 0 of the register 230 contains the value of an address indicating the location of the element.

Responsive to a single instruction, the value in the 8-bit counter 240b is provided to an 8-bit incrementer 250, which is configured to increment the value, resulting in an updated value 290b. The value in the 8-bit counter 240b is also provided to one input of a 2:1 multiplexer 270. Another input of the 2:1 multiplexer 270 receives the value of the 8-bit index 240a.

Responsive to the same instruction, the value in slot of the register 210 is provided to one input of a 2:1 multiplexer 280. Another input of the 2:1 multiplexer 280 receives the value in slot 0 of the register 220.

Also responsive to the same instruction, the value in slot 0 of the register 220 is provided to one input of a comparison element 260. Another input of the comparison element 260 receives the value in slot 0 of the register 210. The comparison element 260 is configured to produce a logical '1' output when slot 0 of register 210 is more extreme than slot 0 of register 220 and a logical '0' output otherwise. The output of the comparison element 260 is provided to selection inputs of both the 2:1 multiplexer 280 and the 2:1 multiplexer 270.

Based on the output of the comparison element 260, the 2:1 multiplexer 280 provides either the value in slot 0 of the register 210 or the value in slot 0 of the register 220. If the search circuitry is configured to identify the maximum value in a data array, the output of the comparison element 260 causes the 2:1 multiplexer 280 to select the value in slot 0 of the register 210 when the value in slot 0 of the register 210 is greater than the value in slot 0 of the register 220. If the search circuitry is configured to identify the minimum value in a data array, the output of the comparison element 260 causes the 2:1 multiplexer 280 to select the value in slot 0 of the register 210 when the value in slot 0 of the register 210 is less than the value in slot 0 of the register 220.

Further based on the output of the comparison element 260, the 2:1 multiplexer 270 provides either the value from the 8-bit index 240*a* or the (unincremented) value from the 8-bit counter 240*b* to an updated index 290*a*. If the search circuitry is configured to identify the maximum value in a data array, the output of the comparison element 260 causes the 2:1 multiplexer 270 to select the value from the 8-bit count 240*b* when the value from slot 0 of register 210 is greater than the value in slot 0 of the register 220. If the search circuitry is configured to identify the minimum value in a data array, the output of the comparison element 260 causes the 2:1 multiplexer 270 to select the value from the 8-bit count 240*b* when the value from slot 0 of register 210 is less than the value in slot 0 of the register 220.

Consequently, as the execution of the instruction nears completion, two values are written to the registers. The same or a more extreme (maximum or minimum) value in the data array is written to slot 0 of the register 220, and the value of the location corresponding to the same or more extreme data array value, together with an incremented counter value, is written to slot 0 of the register 230.

In one embodiment, the search circuitry of FIG. 2 can determine the extreme absolute value of an array. Accordingly, such search circuit includes an absolute value circuit (not shown) interposed between slot 0 of the register 210 and the comparator 260.

In the illustrated embodiment, the execution of the above-described instruction takes only one clock cycle. In alternative embodiments, the execution takes more than one clock cycle but is still the result of the issuance of one instruction.

In the illustrated embodiment, counterparts of the search circuitry are provided in each lane of a SIMD processing unit. Accordingly, counterparts of the search circuitry are provided for slots 1-7 of the registers 210, 220, 230. In one embodiment, each slot contains a separate counter. In another embodiment, a single counter is used for all slots. In yet another embodiment, the incrementer takes the form of an adder, allowing the index to be incremented by a fixed value greater than one. By initializing each index differently (e.g., to correspond to each slot number) instead of zero and adding the width of the SIMD (e.g., a width of eight lanes), the indices will point directly to the offset in the array.

Further, those skilled in the pertinent art should understand that the slots, index and counter may be of different width. One embodiment illustrating this fact will now be described.

Figure 3:
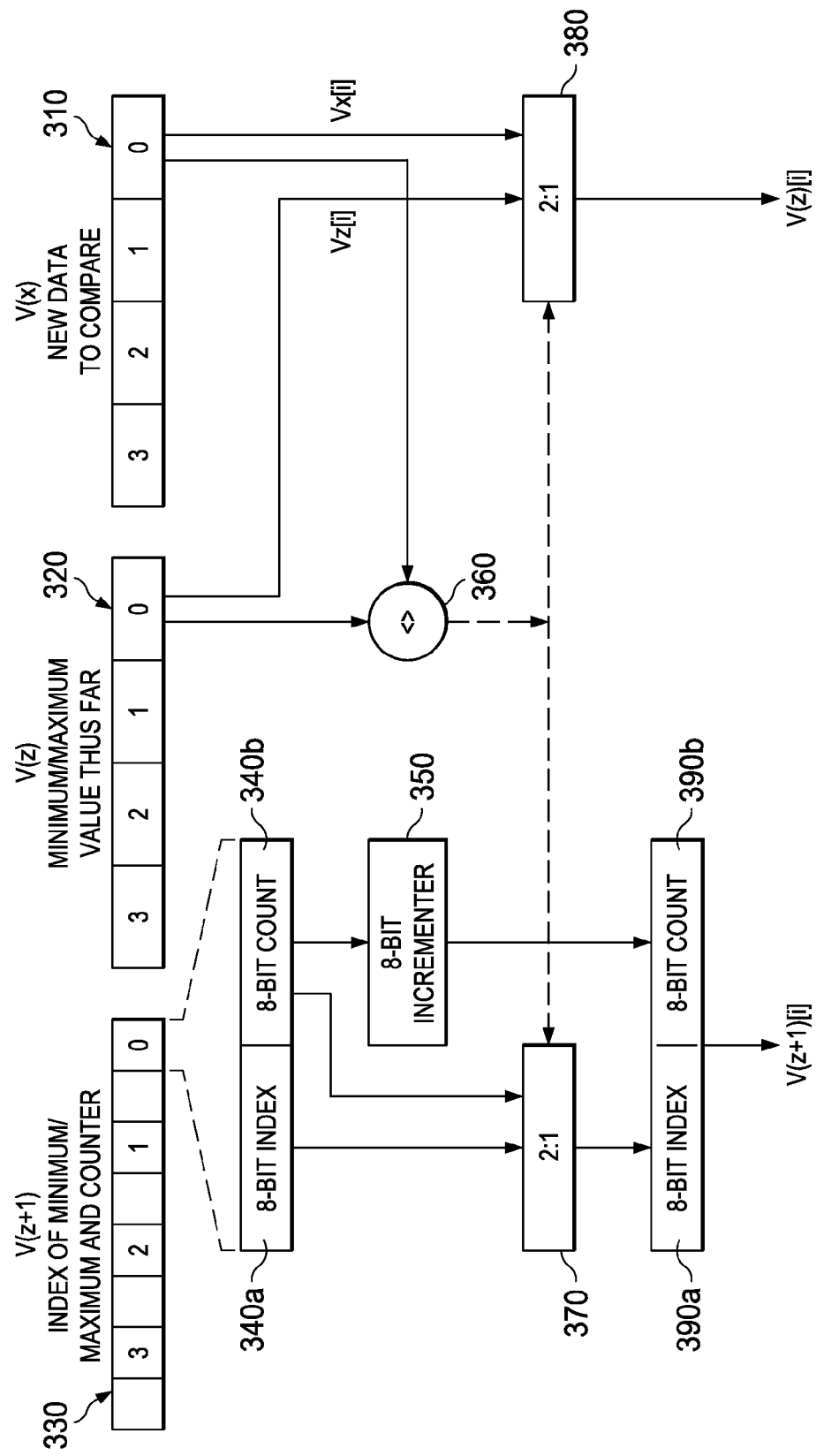
FIG. 3 is a schematic diagram of one embodiment of search circuitry for searching a data array to identify an extreme value therein and a location thereof operable having a 32-bit datapath.

FIG. 3 is a schematic diagram of one embodiment of search circuitry for searching a data array to identify an extreme value therein and a location thereof operable having a 32-bit datapath. FIG. 3 illustrates registers 310, 320, 330, an index 340*a* and count 340*b*, an incrementer 350, a comparison element 360, 2:1 multiplexers 370, 380 and updated index and counter 390*a*, 390*b*. FIG. 3 differs from FIG. 2 in that the slots of the registers 310, 320 are 32 bits wide instead of 16 bits wide. In an alternative embodiment, the slots of the register 330 are likewise 32 bits wide, and the index and count 340*a*, 340*b*, incrementer 350 and updated index and count 390*a*, 390*b* are 16 bits wide.

With the benefit of search circuitry as illustrated in FIG. 2 or 3, each step in the search of a data array for an element therein of an extreme value may be quickly and efficiently undertaken. Assuming each element is compared, the extreme element will ultimately be properly identified in terms of both its value and location.

Assuming an embodiment of the search circuitry is part of a SIMD processing unit and further assuming that counterparts of the search circuitry are associated with each lane of the SIMD processing unit, a data array can be searched in parallel for even greater speed and efficiency. In such embodiment, each step of the search is performed concurrently on as many elements of the data array as there are lanes in the SIMD processing unit.

For example, in an SIMD processing unit having eight lanes such as reflected in FIG. 2, an 800-element data array can be processed in 100 instructions, and perhaps in 100 clock cycles. However, it should be noted that eight "candidate" extreme values and corresponding locations will result after processing, one for each lane. Accordingly, a subsequent search among the eight candidate extreme values should be undertaken to determine which is the most extreme. The search circuitry can be employed to carry out this search as well.

In an SIMD processing unit in which its eight lanes are combined into four, double-wide lanes such as reflected in FIG. 3, an 800-element data array can be processed in 200 instructions, resulting in only four candidate extreme values and corresponding locations that then need to be winnowed down to determine which is the most extreme.

Figure 4:
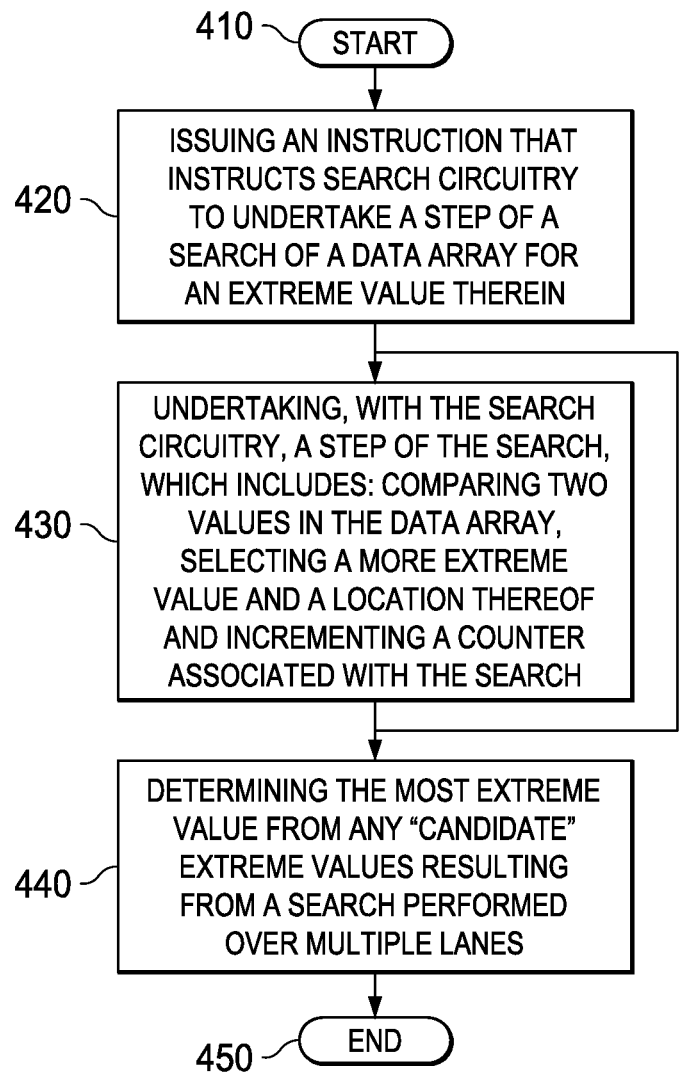
FIG. 4 is a flow diagram of one embodiment of a method of searching a data array to identify an extreme value therein and a location thereof.

FIG. 4 is a flow diagram of one embodiment of a method of searching a data array to identify an extreme value therein and a location thereof. The method begins in a step 410. In a step 420, an instruction is issued that instructs search circuitry to undertake a step of a search of a data array for an extreme value therein. In a step 430, the search circuitry undertakes a step of the search, which includes: (1) comparing element values, (2) copying evermore extreme values and their locations and (3) incrementing the index. The step 430 may be repeated as necessary to search the entire data array. In a step 440, in searches performed over multiple lanes, the most extreme value is determined among any per-lane, candidate extreme values. In one embodiment, an instruction could be provided configured to select the most extreme value among all the slots in a vector register and save the extreme value, together with the corresponding slots from the register used for indexes. The method ends in an end step 450.

Those skilled in the art to which this application relates will appreciate that other and further additions, deletions, substitutions and modifications may be made to the described embodiments.

What is claimed is:

1. Search circuitry of a single-instruction, multiple-data (SIMD) processing unit responsive to a single instruction for undertaking a step of a search of a data array for an extreme value therein, comprising:
   a comparison element configured to compare two values in said data array;
   a first multiplexer coupled to said comparison element and configured to select a more extreme value of said two values;
   a second multiplexer coupled to said comparison element and configured to provide an index of said more extreme value, wherein said index is selected from at least an indexed value and an unincremented counter value; and
   an incrementer configured to increment a counter associated with said search by one for each search step, said incrementer shared by all lanes of said SIMD;
   wherein said search circuitry carries out said step in a single clock cycle, said step including said comparing, selecting, and incrementing.

2. The search circuitry as recited in claim 1 wherein said extreme value is a maximum value.

3. The search circuitry as recited in claim 1 wherein said counter is an 8-bit counter and said incrementer is an 8-bit incrementer.

4. The search circuitry as recited in claim 1 wherein said search circuitry is embodied in a single-instruction, multiple-data processing unit.

5. The search circuitry as recited in claim 1 wherein a counterpart of said search circuitry is embodied in each lane of a single-instruction, multiple-data processing unit.

6. The search circuitry as recited in claim 1 wherein said search circuitry is further employable to determine a most extreme value among any per-lane, candidate extreme values.

7. A method of searching a data array to identify an extreme value therein and a location thereof, comprising:
   issuing a single instruction that instructs search circuitry to undertake a step of a search of a data array for an extreme value therein, said search circuitry performing in said step:
      comparing values of two elements in said data array,
      selecting, with a first multiplexer, a more extreme value of said two values;
      selecting, with a second multiplexer, an index of said more extreme value, wherein said index is selected from at least an indexed value and an unincremented counter value, and
      incrementing a counter associated with said search by one;
   wherein said comparing, selecting, and incrementing are carried out in a single clock cycle.

8. The method as recited in claim 7 wherein said extreme value is a maximum value.

9. The method as recited in claim 7 wherein said counter is an 8-bit counter.

10. The method as recited in claim 7 wherein said search circuitry is embodied in a single-instruction, multiple-data processing unit.

11. The method as recited in claim 7 further comprising carrying out said comparing, said selecting and said incrementing in each lane of a single-instruction, multiple-data processing unit.

12. The method as recited in claim 7 further comprising employing said search circuitry to determine a most extreme value among any per-lane, candidate extreme values.

13. A single-instruction, multiple-data processing unit, comprising:
   a pipeline control unit;
   register files coupled to said pipeline control unit;
   a load/store unit coupled to said register files; and
   search circuitry coupled to said register files and responsive to a single instruction for undertaking a step of a search of a data array for an extreme value therein, including:
      comparison elements configured to compare two values in said data array,
      a first multiplexer coupled to said comparison elements and configured to select a more extreme value of said two values;
      a second multiplexer coupled to said comparison element and configured to provide an index of said more extreme value, wherein said index is selected from at least an indexed value and an unincremented counter value, and
      incrementers configured to increment counters associated with said search by one for each search step;
      wherein said search circuitry carries out said step in a single clock cycle, said step including said comparing, selecting, and incrementing.

14. The processing unit as recited in claim 13 wherein said extreme value is a maximum value.

15. The processing unit as recited in claim 13 wherein said counter is an 8-bit counter and said incrementer is an 8-bit incrementer.

16. The processing unit as recited in claim 13 wherein a counterpart of said search circuitry is embodied in each lane of said single-instruction, multiple-data processing unit.

17. The processing unit as recited in claim 13 wherein said search circuitry is further employable to determine a most extreme value among any per-lane, candidate extreme values.

* * * * *